United States Patent
Guerrero

(10) Patent No.: US 10,165,274 B2
(45) Date of Patent: *Dec. 25, 2018

(54) ENCODING OF VIDEO STREAM BASED ON SCENE TYPE

(71) Applicant: EYE IO, LLC, Palo ALto, CA (US)

(72) Inventor: Rodolfo Vargas Guerrero, Palo Alto, CA (US)

(73) Assignee: EYE IO, LLC, Palo Alto, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/383,726

(22) Filed: Dec. 19, 2016

(65) Prior Publication Data

US 2017/0099485 A1    Apr. 6, 2017

Related U.S. Application Data

(63) Continuation-in-part of application No. 13/359,435, filed on Jan. 26, 2012.

(Continued)

(51) Int. Cl.
| | |
|---|---|
| *H04N 19/124* | (2014.01) |
| *H04N 19/117* | (2014.01) |
| *H04N 19/196* | (2014.01) |
| *H04N 19/142* | (2014.01) |
| *H04N 19/179* | (2014.01) |
| *H04N 19/86* | (2014.01) |
| *H04N 19/87* | (2014.01) |
| *H04N 19/172* | (2014.01) |
| *H04N 19/176* | (2014.01) |
| *H04N 19/182* | (2014.01) |

(Continued)

(52) U.S. Cl.
CPC ......... *H04N 19/124* (2014.11); *H04N 19/117* (2014.11); *H04N 19/142* (2014.11); *H04N 19/179* (2014.11); *H04N 19/196* (2014.11); *H04N 19/86* (2014.11); *H04N 19/87* (2014.11); *H04N 19/107* (2014.11); *H04N 19/109* (2014.11); *H04N 19/172* (2014.11); *H04N 19/176* (2014.11); *H04N 19/182* (2014.11)

(58) Field of Classification Search
CPC .................................... H04N 19/179
USPC ......................... 375/240.01–240.2
See application file for complete search history.

(56) References Cited

U.S. PATENT DOCUMENTS

| | | | | |
|---|---|---|---|---|
| 5,995,080 A | * | 11/1999 | Biro ..................... | H04N 19/176 345/530 |
| 6,026,217 A | * | 2/2000 | Adiletta ............... | H04N 19/159 375/E7.093 |

(Continued)

FOREIGN PATENT DOCUMENTS

JP    2005318372 A  * 11/2005

*Primary Examiner* — Dave Czekaj
*Assistant Examiner* — Shanika Brumfield
(74) *Attorney, Agent, or Firm* — Stevens Law Group; David R. Stevens

(57) ABSTRACT

An encoder for encoding a video stream or an image is described herein. The encoder receives an input video stream and outputs an encoded video stream that can be decoded at a decoder to recover, at least approximately, an instance of the input video stream. The encoder encodes a video stream by first identifying scene boundaries and encoding frames between scene boundaries using a set of parameters. For at least two different scene sequences, different sets of parameters are used, providing adaptive, scene-based encoding.

25 Claims, 11 Drawing Sheets

BLOCK DIAGRAM OF VIDEO ENCODING APPARATUS

Related U.S. Application Data

(60) Provisional application No. 61/437,211, filed on Jan. 28, 2011, provisional application No. 61/437,193, filed on Jan. 28, 2011.

(51) Int. Cl.
*H04N 19/107* (2014.01)
*H04N 19/109* (2014.01)

(56) References Cited

U.S. PATENT DOCUMENTS

| | | | |
|---|---|---|---|
| 6,292,589 B1* | 9/2001 | Chow | H04N 19/197 348/416.1 |
| 6,909,745 B1* | 6/2005 | Puri | H04N 19/70 348/384.1 |
| 8,264,616 B2* | 9/2012 | Sugano | G06K 9/00711 348/171 |
| 2001/0017887 A1* | 8/2001 | Furukawa | H04N 19/139 375/240.03 |
| 2002/0024999 A1* | 2/2002 | Yamaguchi | G11B 27/031 375/240.03 |
| 2005/0094870 A1* | 5/2005 | Furukawa | H04N 19/139 382/155 |
| 2007/0074251 A1* | 3/2007 | Oguz | H04N 19/105 725/45 |
| 2007/0074266 A1* | 3/2007 | Raveendran | H04N 5/144 725/135 |
| 2007/0174272 A1* | 7/2007 | Carter | G06K 9/72 |
| 2007/0201558 A1* | 8/2007 | Xu | G06K 9/6218 375/240.22 |
| 2007/0253699 A1* | 11/2007 | Yen | G06K 9/00664 396/311 |
| 2009/0092191 A1* | 4/2009 | Otsuka | H04N 19/176 375/240.26 |
| 2009/0154816 A1* | 6/2009 | Swazey | H04N 19/61 382/232 |
| 2011/0109758 A1* | 5/2011 | Liang | H04N 19/00163 348/222.1 |
| 2011/0216836 A1* | 9/2011 | Luo | H04N 19/00 375/240.25 |
| 2012/0195369 A1* | 8/2012 | Guerrero | H04N 19/46 375/240.02 |

* cited by examiner

BLOCK DIAGRAM OF VIDEO ENCODING APPARATUS

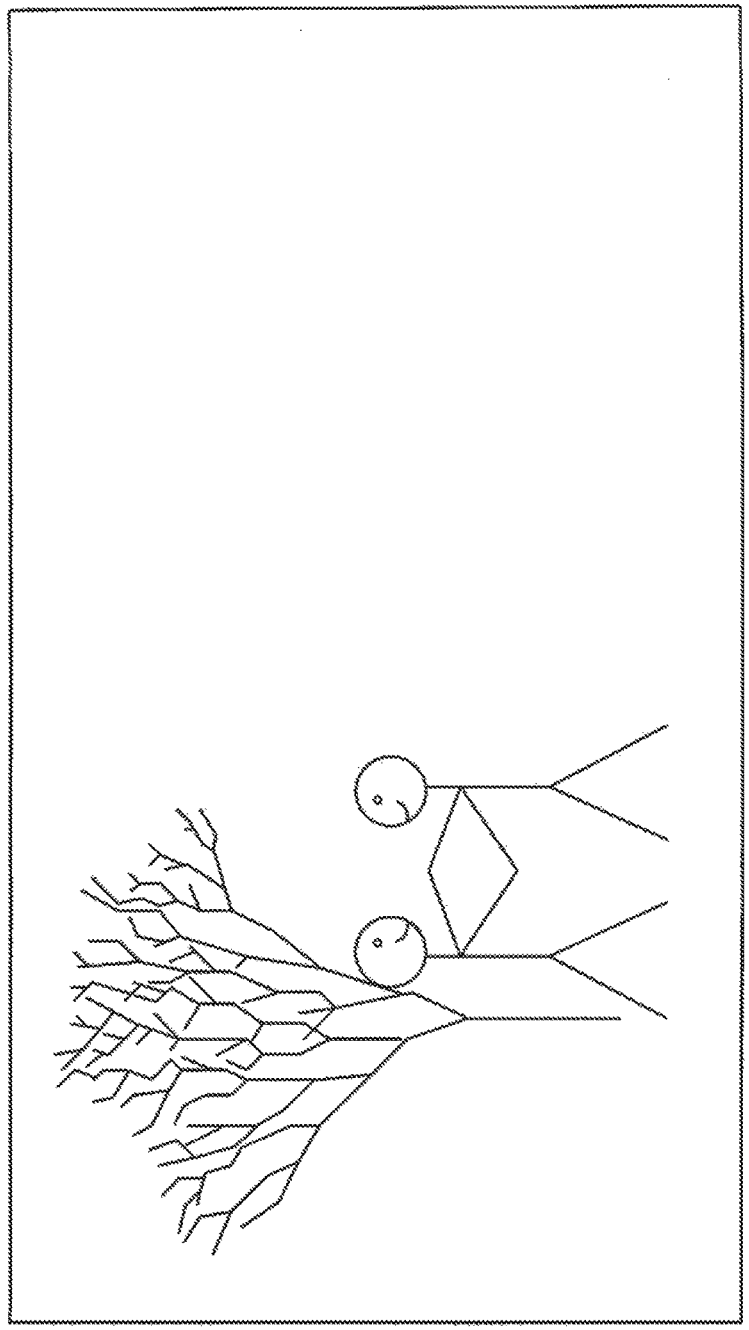

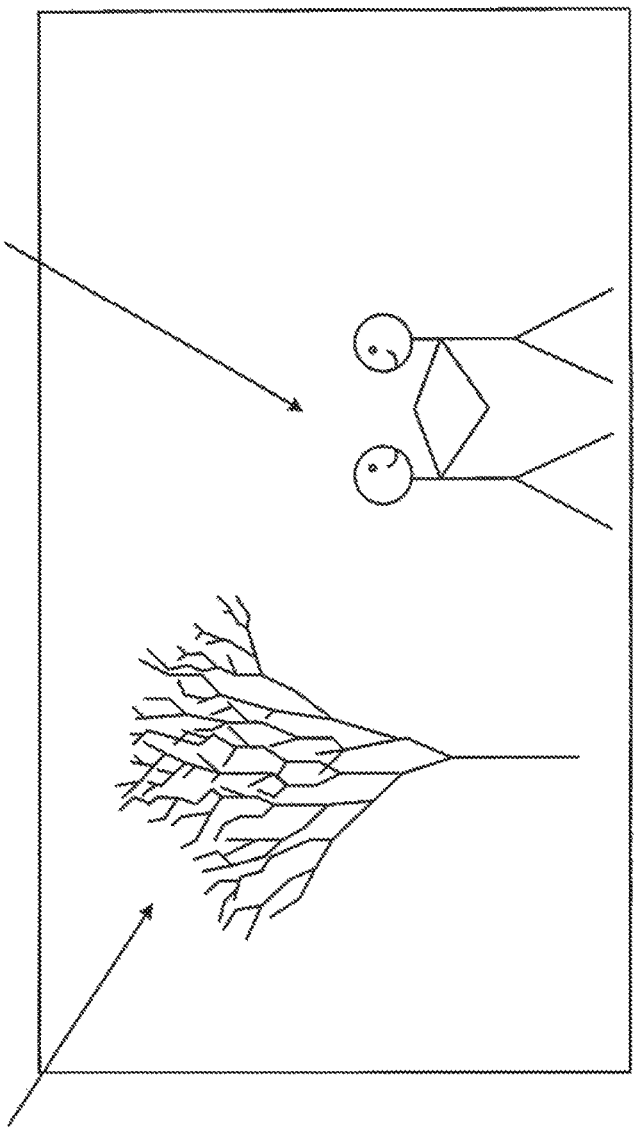
FIG. 5.2

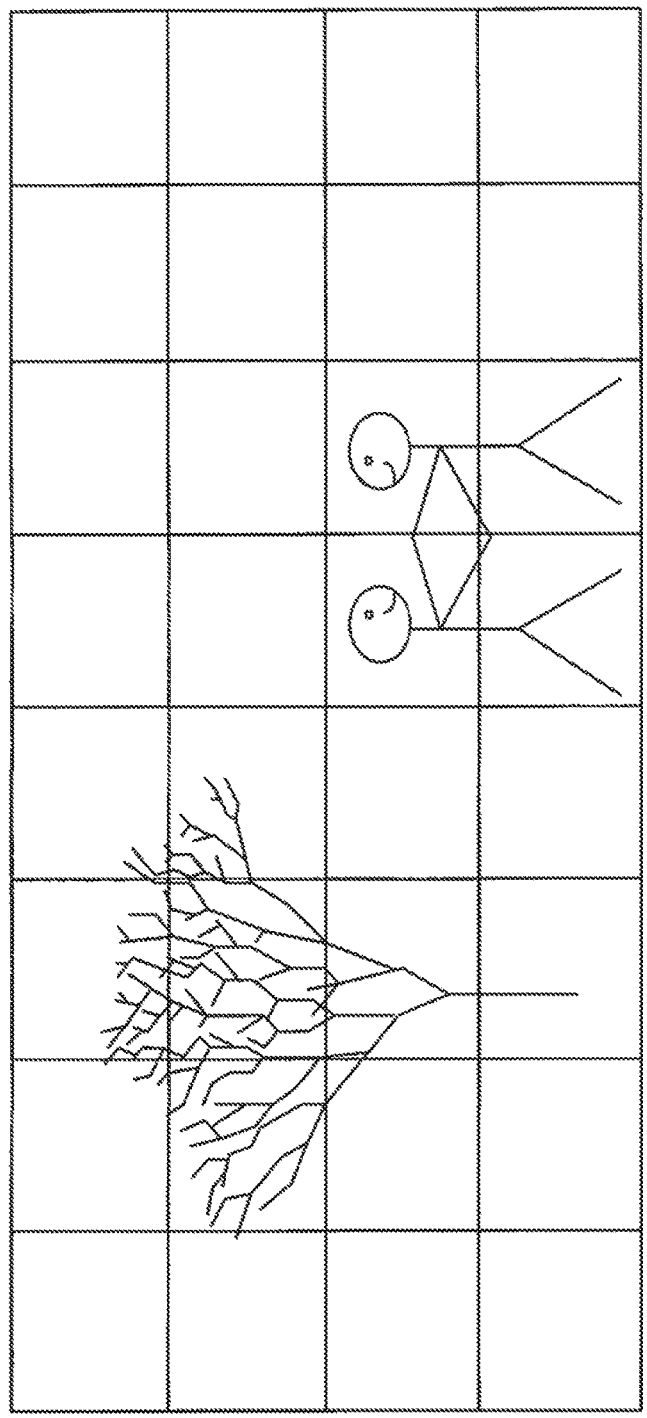
FIG. 5.3

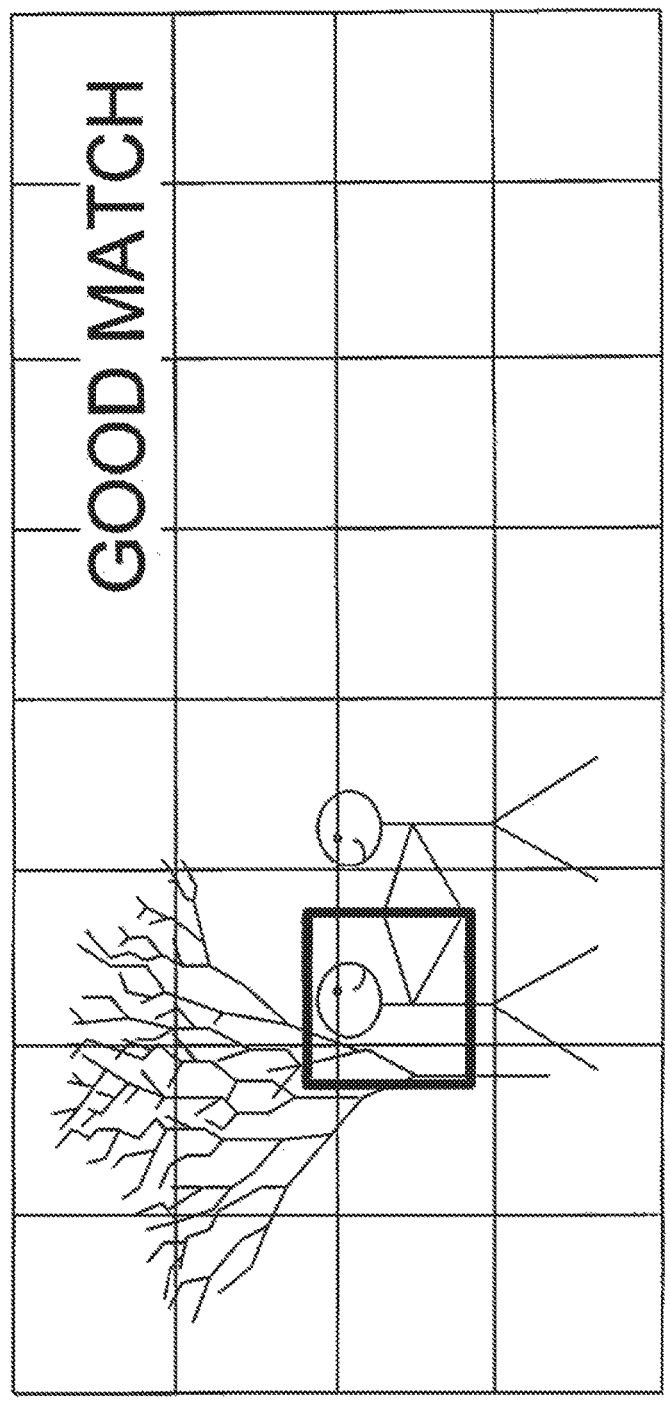
FIG. 5.4

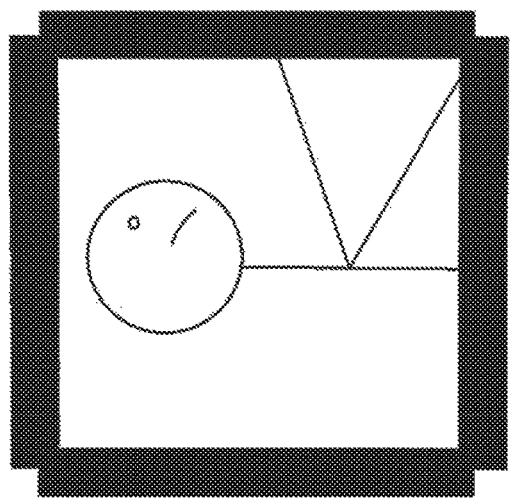
FIG. 5.5
Macroblock to be coded

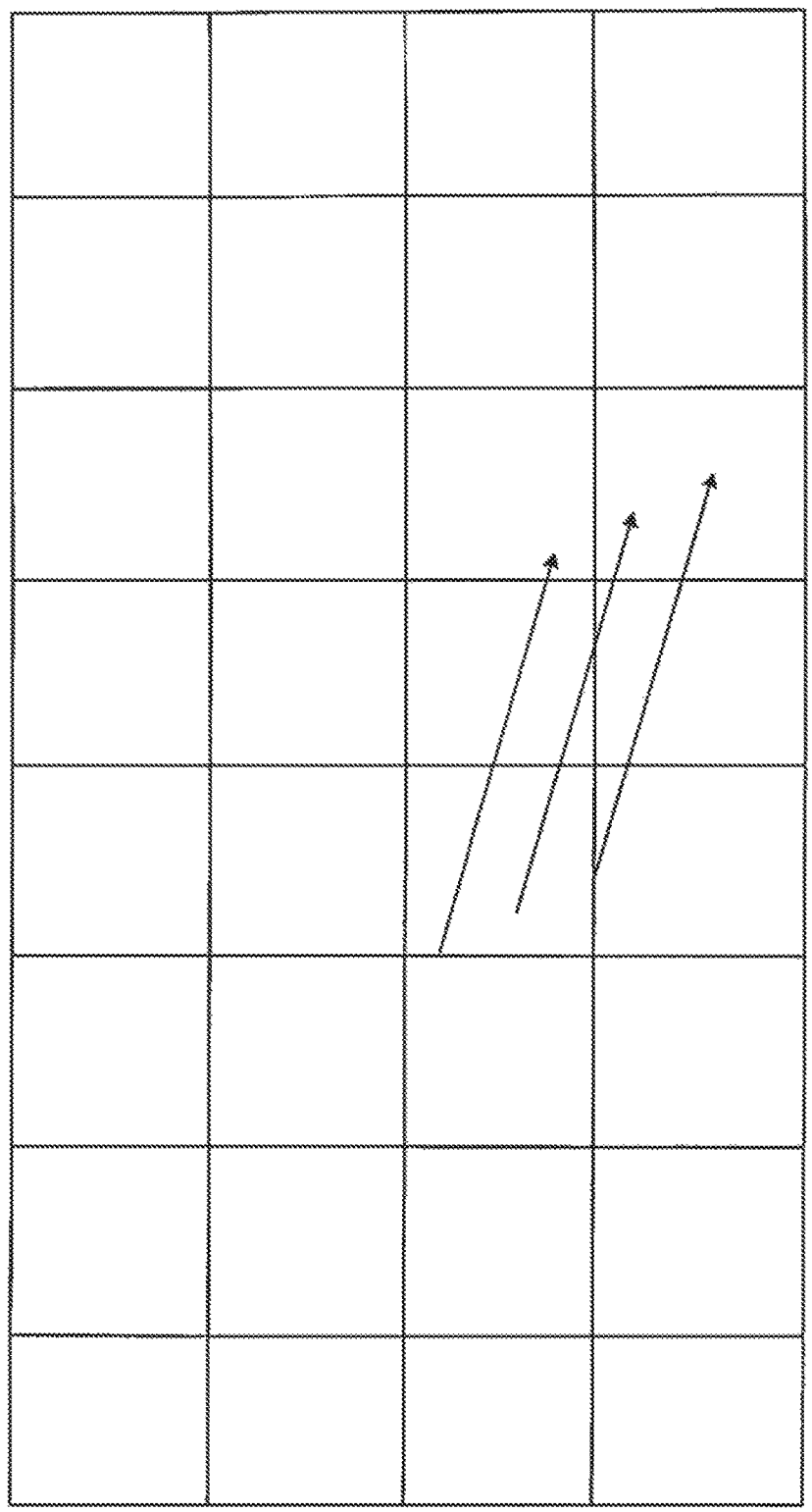
FIG. 5.6

ENCODING OF VIDEO STREAM BASED ON SCENE TYPE

PRIORITY CLAIM

This application is a continuation to U.S. patent application Ser. No. 13/359,435, entitled "Encoding of Video Stream Based on Scene Type", which was filed on Jan. 26, 2012, the contents of which are expressly incorporated by reference herein. That application also claims priority to U.S. Provisional Patent Application No. 61/437,193, entitled "Encoding of a video stream based on scenes with different parameters used for different scenes", which was filed on Jan. 28, 2011, and U.S. Provisional Patent Application No. 61/437,211, entitled "Video encoding bit-rate control of a video sequence based on screenplay structure and human attention", which was filed on Jan. 28, 2011, the contents of which are expressly incorporated by reference herein.

FIELD OF THE INVENTION

The present invention relates to video encoding techniques, and more particularly, to automatic selection of video encoding parameters for video encoding.

BACKGROUND

While video streaming continues to grow in popularity and usage among everyday users, there are several inherent limitations that need to be overcome. For example, users often want to watch a video over the Internet having only a limited bandwidth for obtaining that video stream. In instances, users might want to obtain the video stream over a mobile telephone connection or a home wireless connection. In some scenarios, users compensate for the lack of adequate bandwidth by spooling content (i.e., download content to local storage for eventual viewing). This method is rife with several disadvantages. First, the user is unable to have a real "run-time" Experience—that is, the user is unable to view a program when he decides to watch it. Instead, he has to experience significant delays for the content to be spooled prior to viewing the program. Another disadvantage is in the availability of storage—either the provider or the user has to account for storage resources to ensure that the spooled content can be stored, even if for a short period of time, resulting in unnecessary utilization of expensive storage resources.

A video stream (typically containing an image portion and an audio portion) can require considerable bandwidth, especially at high resolution (e.g., HD videos). Audio typically requires much less bandwidth, but still sometimes needs to be taken into account. One streaming video approach is to heavily compress the video stream enabling rapid video delivery to allow a user to view content in run-time or substantially instantaneously (i.e., without experiencing substantial spooling delays). Typically, lossy compression (i.e., compression that is not entirely reversible) provides more compression than lossless compression, but heavy lossy compression provides an undesirable user experience.

In order to reduce the bandwidth required to transmit digital video signals, it is well known to use efficient digital video encoding where the data rate of a digital video signal may be substantially reduced (for the purpose of video data compression). In order to ensure interoperability, video encoding standards have played a key role in facilitating the adoption of digital video in many professional- and consumer applications. Most influential standards are traditionally developed by either the International Telecommunications Union (ITU-T) or the MPEG (Motion Pictures Experts Group) 15 committee of the ISO/IEC (the International Organization for Standardization/the International Electrotechnical Committee. The ITU-T standards, known as recommendations, are typically aimed at real-time communications (e.g. videoconferencing), while most MPEG standards are optimized for storage (e.g. for Digital Versatile Disc (DVD>> and broadcast (e.g. for Digital Video Broadcast (OVB) standard).

At present, the majority of standardized video encoding algorithms are based on hybrid video encoding. Hybrid video encoding methods typically combine several different lossless and lossy compression schemes in order to achieve desired compression gain. Hybrid video encoding is also the basis for ITV-T standards (H.26x standards such as H.261, H.263) as well as ISO/IEC standards (MPEG-X standards such as MPEG-1, MPEG-2, and MPEG-4). The most recent and advanced video encoding standard is currently the standard denoted as H.264/MPEG-4 advanced video coding (AVC) which is a result of standardization efforts by joint video team (JVT), a joint team of ITV-T and ISO/IEC MPEG groups.

The H.264 standard employs the same principles of block-based motion compensated hybrid transform coding that are known from the established standards such as MPEG-2. The H.264 syntax is, therefore, organized as the usual hierarchy of headers, such as picture-, slice- and macro-block headers, and data, such as motion-vectors, block-transform coefficients, quantizer scale, etc. However, the H.264 standard separates the Video Coding Layer (VCL), which represents the content of the video data, and the Network Adaptation Layer (NAL), which formats data and provides header information.

Furthermore, H.264 allows for a much increased choice of encoding parameters. For example, it allows for a more elaborate partitioning and manipulation of 16.times.16 macro-blocks whereby e.g. motion compensation process can be performed on segmentations of a macro-block as small as 4.times.4 in size. Also, the selection process for motion compensated prediction of a sample block may involve a number of stored previously-decoded pictures, instead of only the adjacent pictures. Even with intra coding within a single frame, it is possible to form a prediction of a block using previously-decoded samples from the same frame. Also, the resulting prediction error following motion compensation may be transformed and quantized based on a 4.times.4 block size, instead of the traditional 8.times.8 size. Additionally, an in-loop deblocking filter that reduces block artifacts may be used.

The H.264 standard may be considered a superset of the H.262/MPEG-2 video encoding syntax in that it uses the same global structuring of video data while extending the number of possible coding decisions and parameters. A consequence of having a variety of coding decisions is that a good trade-off between the bit rate and picture quality may be achieved. However, although it is commonly acknowledged that while the H.264 standard may significantly reduce typical artifacts of block-based coding, it can also accentuate other artifacts. The fact that H.264 allows for an increased number of possible values for various coding parameters thus results in an increased potential for improving the encoding process, but also results in increased sensitivity to the choice of video encoding parameters.

Similar to other standards, H.264 does not specify a normative procedure for selecting video encoding parameters, but describes through a reference implementation, a number of criteria that may be used to select video encoding parameters such as to achieve a suitable trade-off between coding efficiency, video quality and practicality of implementation. However, the described criteria may not always result in an optimal or suitable selection of coding parameters suitable for all kind of contents and applications. For example, the criteria may not result in selection of video encoding parameters optimal or desirable for the characteristics of the video signal or the criteria may be based on attaining characteristics of the encoded signal which are not appropriate for the current application.

Accordingly, an improved system for video encoding would be advantageous.

The foregoing examples of the related art and limitations related therewith are intended to be illustrative and not exclusive. Other limitations of the related art will become apparent upon a reading of the specification and a study of the drawings.

SUMMARY

The present teaching contemplates a variety of methods, systems and encoders for encoding a video stream. Introduced herein is an encoder for encoding a video stream. The encoder receives an input video stream and outputs an encoded video stream that can be decoded at a decoder to recover, at least approximately, an instance of the input video stream. In embodiments of the present invention, an encoder encodes a video stream or stored sequence by first identifying scene boundaries and encoding frames between scene boundaries (i.e., "a scene sequence" comprising one or more image frames) using a set of parameters.

In one embodiment of the present invention, a scene change can be identified in the video stream where the camera suddenly changes from one viewing angle to another such that the difference between two frames on each side of a scene change is not as compressible as other frames shot from the same viewing angle. For at least two different scene sequences, different sets of parameters are used, this providing adaptive, scene-based encoding.

This Summary is provided to introduce a selection of concepts in a simplified form that are further described below in the Detailed Description. This Summary is not intended to identify key features or essential features of the claimed subject matter, not is it intended to be used to limit the scope of the claimed subject matter.

BRIEF DESCRIPTION OF THE DRAWINGS

One or more embodiments of the present invention are illustrated by way of example and are not limited by the figures of the accompanying drawings, in which like references indicate similar elements.

FIG. 5.1 through FIG. 5.6 explain motion estimation in a frame.

DETAILED DESCRIPTION

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

In one embodiment of the present invention, an encoder is provided to receive an input video stream and output an encoded video stream that can be decoded at a decoder to recover, at least approximately, an instance of the input video stream. The encoder comprises: an input module for receiving an input video stream; a video processing module to divide the video stream into a plurality of scenes based on scene boundaries, wherein the video processing module determines a given scene boundary according to the relatedness of two temporally contiguous image frames in the input video stream; the video processing module to further determine a scene type for each of the plurality of scenes, each scene type being associated with one or more of a plurality of predetermined encoder parameters used by a video encoder to encode the given scene type; and a video encoding module to encoding each of the plurality of scenes according to the scene type associated with each of the plurality of scenes.

In this manner, the encoder can encode an input video stream at a quality that best suits each of the scenes in the input video stream being encoded.

Figure 1:
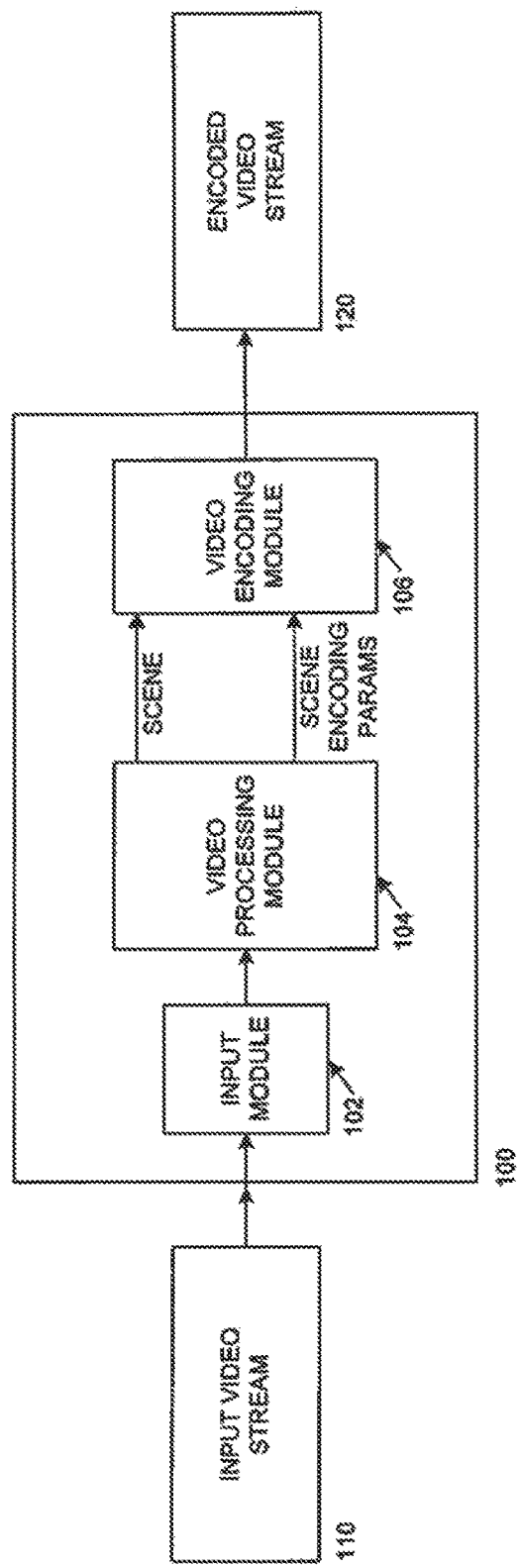
FIG. 1 illustrates an example of an encoder.

FIG. 1 illustrates an example of an encoder 100, according to one embodiment of the present invention. The encoder 100 receives an input video stream 110 and outputs an encoded video stream 120 that can be decoded at a decoder to recover, at least approximately, an instance of the input video stream 110. The encoder 100 comprises an input module 102, a video processing module 104, and a video encoding module 106. The encoder 100 may be implemented in hardware, software, or any suitable combination. The encoder 100 may include other components such as a parameter input module, memory for storing parameters, etc. The encoder 100 may perform other video processing functions not specifically described herein.

The input module 102 receives the input video stream 110. The input video stream 110 may take any suitable form, and may originate from any of a variety of suitable sources such as memory, or even from a live feed.

The video processing module 104 analyzes an input video stream 110 and splits the video stream 110 into a plurality of scenes along with their respective video encoding parameters for each of the plurality of scenes. In one embodiment, video processing module 104 divides the video stream into a plurality of scenes based on scene boundaries, wherein the scene boundaries are determined according to the relatedness of two temporally contiguous image frames in the input video stream. The video processing module 104 further determines a scene type for each of the plurality of scenes. Finally, the video processing module 104 determines video encoding parameters used by a video encoder 106 to encode each scene by associating each scene type with one or more of a plurality of predetermined encoder parameters. The parameters may be predefined for each scene type, or may be calculated and/or adapted during the video stream processing. The video encoding module 106 receives a plurality of scenes and their respective video encoding parameters from the video processing module 104 to encode each of the plurality of scenes according to their respective encoding parameters and output an encoded video stream 120.

Figure 2:
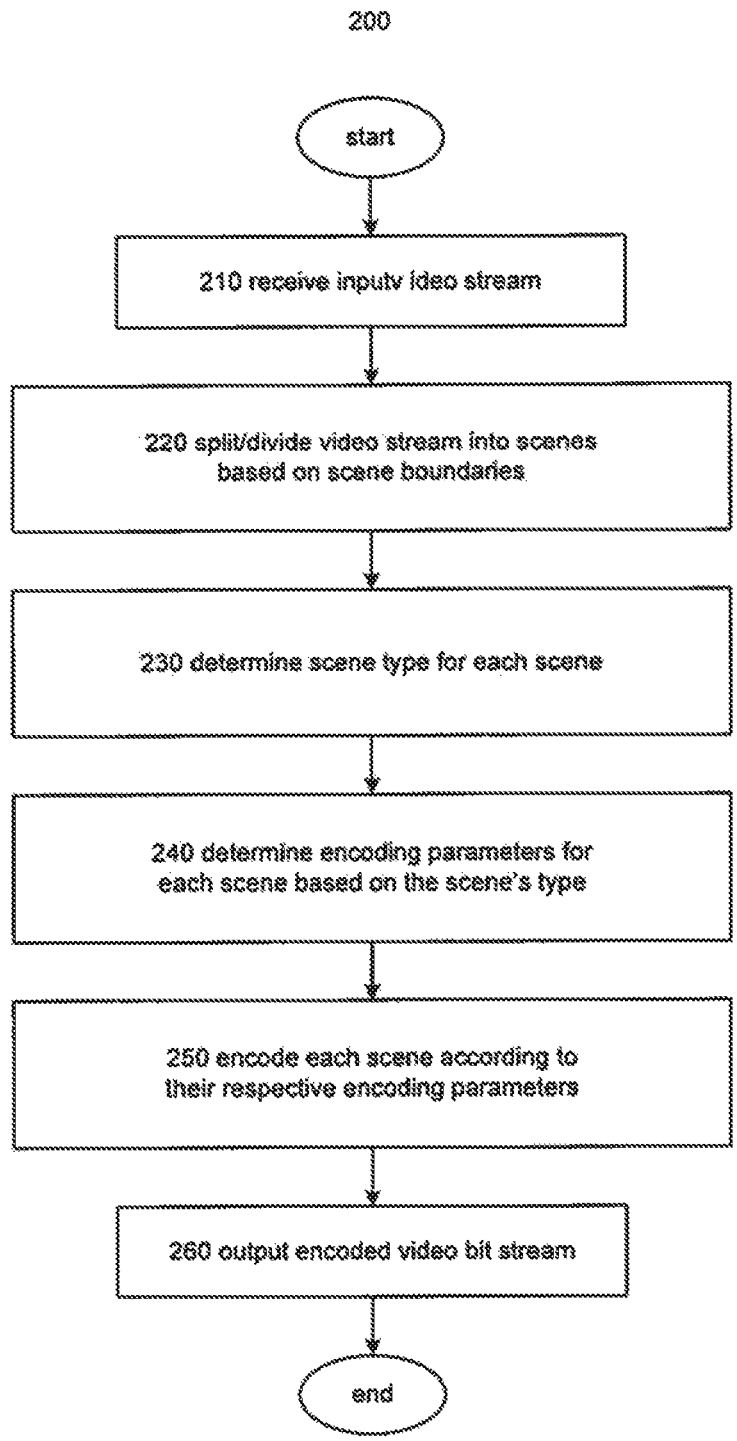
FIG. 2 illustrates steps of a method for encoding an input video stream.

FIG. 2 illustrates steps of a method 200 for encoding an input video stream. The method 200 encodes the input video stream to an encoded video bit stream that can be decoded at a decoder to recover, at least approximately, an instance of the input video stream. At step 210, the method receives an input video stream to be encoded. At step 220, the video stream is split into a plurality of scenes based on scene boundaries. Here, as discussed in further detail below with reference to FIG. 3, the method determines scene boundaries according to the relatedness of two temporally contiguous image frames in the input video stream. However, any of a variety of other suitable mechanisms may be utilized to distinguish between scene types. Then in step 230, the process determines a scene type for each of the plurality of scenes. At step 240, the process determines video encoding parameters to encode each scene by mapping each scene's type with appropriate predetermined encoder parameters, as is also discussed in further detail below. At Step 250, the process encodes the scenes according to each scene's respective video encoding parameters (as, for example, determined in step 240). At step 260, the process outputs the encoded video bit stream.

The above process is elaborated in more detail in the following sections. The input video stream typically includes multiple image frames. Each image frame can typically be identified based on a distinct "time position" in the input video stream. In embodiments, the input video stream can be a stream that is made available to the encoder in parts or discrete segments. In such instances, the encoder outputs the encoded video bit stream (for example, to a final consumer device such as a HDTV) as a stream on a rolling basis before even receiving the entire input video stream.

In embodiments, the input video stream and the encoded video bit stream are stored as a sequence of streams. Here, the encoding may be performed ahead of time and the encoded video streams may then be streamed to a consumer device at a later time. Here, the encoding is completely performed on the entire video stream prior to being streamed over to the consumer device. It is understood that other examples of pre, post, or "inline" encoding of video streams, or a combination thereof, as may be contemplated by a person of ordinary skill in the art, are also contemplated in conjunction with the techniques introduced herein.

In embodiments, scene boundaries in an input video stream are determined by first scaling and removing any high frequency elements present in each image frame. Next, the difference between two image frames that are temporally contiguous to each other on the input video stream's timeline is determined. In some instances, for example, the difference between two images may be discriminated using recursive or adaptive filters. When the computed difference exceeds a set threshold that signals a scene change, the two image frames are determined to be part of two different scene sequences and therefore, a scene boundary is established between the two image frames. By repeating the scene boundary determination process between temporally contiguous image frames, the input video stream can be divided into, for example, an ordered set of scene sequences.

In embodiments, as illustrated in reference to FIG. 2 above, a scene type may be determined for each of the plurality of scene sequence in conjunction with the encoding process. In some instances, a scene sequence type may be determined utilizing one or more of the following scene sequence parameters: (i) position of the scene sequence in the input stream's timeline; (ii) the scene sequence's length; (iii) its motion vector estimation; (iv) the scene sequence's effective difference from previous frames; (v) the scene sequence's spectral data size; (vi) the scene's textual content determined using optical character recognition; (vii) the scene's screenplay attributes based on screenplay structure information; etc. Additionally, in some instances, facial recognition may be used in the determination of a scene type to determine whether the scene sequence involves faces of individuals.

A given scene type may include, for example, "fast motion", "static", "talking head", "text", "scroll credits", "mostly black images", "short scene of five frames or less", etc. In some instances, scene sequences may not be assigned a particular scene type. In other instances, assigned scene sequences might include scene types, "miscellaneous", "unknown", "default", etc.

In embodiments, once the scene types are assigned, the scene sequences are encoded. In some instances, such encoding is performed by running a parameterized encoding process according to a set of software or hardware instructions. Here, in some instances, a set of highly optimized parameters may be utilized to control details of the encoding according to the scene type. The plurality of parameters might be stored in a scene type database or other data structure or machine learning system. In an illustrative example, a database stored in memory and accessible by the encoder might have the structure illustrated in Table 1. Parameters that are used for encoding, but are not specifically set in the scene type database, may utilize a default parameter value determined at the beginning of the encoding process. In some instances, a default parameter value may be determined based on a value recommended by an encoding standard utilized to encode the input video stream.

Figure 3:
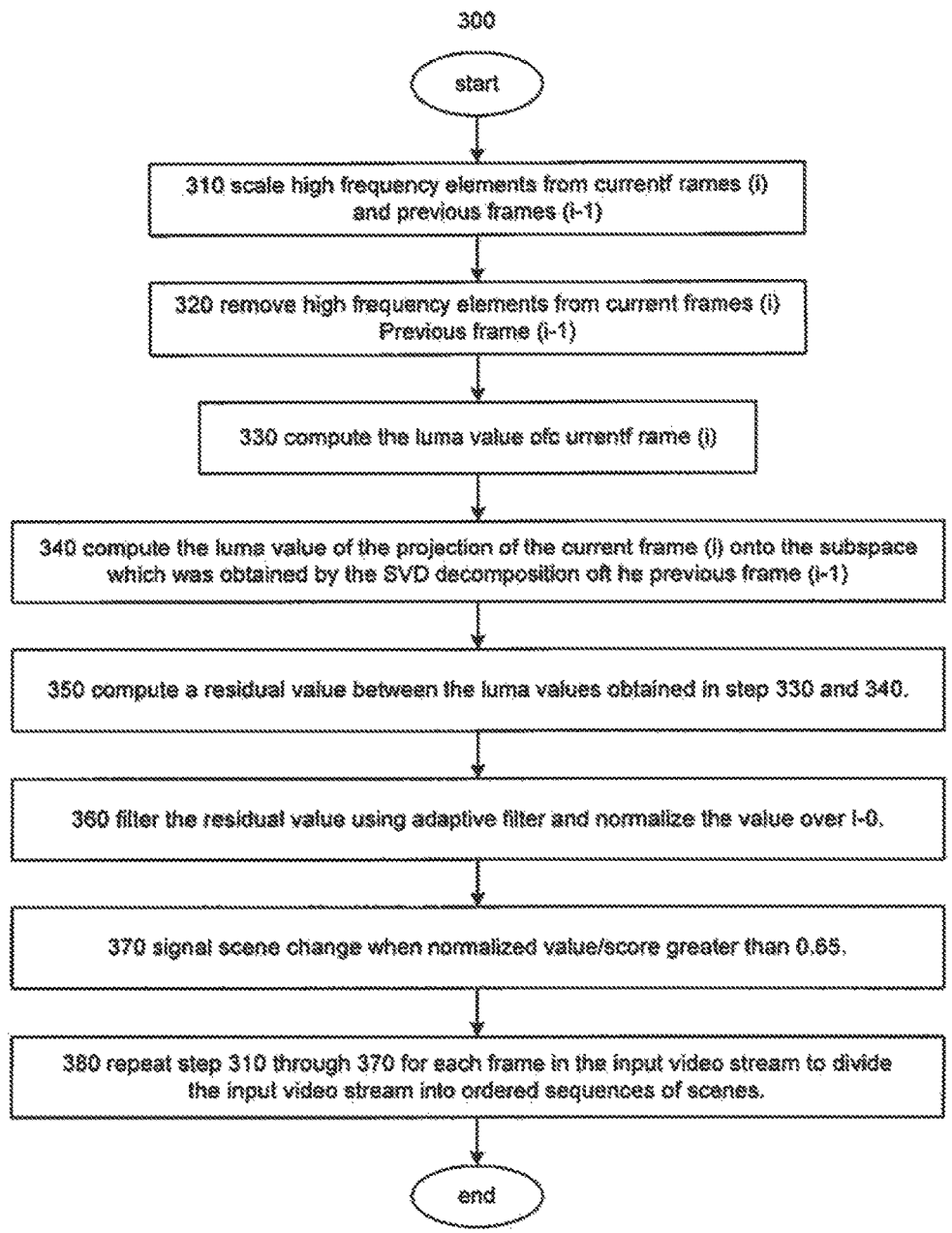
FIG. 3 illustrates steps of a method for dividing an input video stream into a plurality of scene sequences.

TABLE-US-00001 TABLE 1 Motion Estimation Reference Frame Parameters 4 to Scene Type Range Search Quantizers Numbers N . . . fast motion High Motion Low Quantizers with Low Reference Estimation Range high deblocking Frame Numbers Search Static Low motion High Quantizers High Reference Estimation Range Frame Numbers Search talking head Low motion Medium Range Low Reference Estimation Range Quantizers with Frame Numbers Search emphasis on facial areas Text Low motion Low Quantizers, low Medium Reference Estimation Range deblocking Frame Numbers Search mostly black Low motion Very Low No Reference Frame Estimation Range Quantizers, no Numbers Search deblocking short scene High motion Low Quantizers Low Reference Estimation Range Frame Numbers Search Default Medium motion Medium Quantizers Medium Reference Estimation Range Frame Numbers Search FIG. 3 illustrates steps of a method or process 300 for determining scene boundaries in an input video stream. At step 310, the process scales high frequency elements from a current frame (i) and a previous frame (i−1) for which scene boundaries need to be determined. In at least some embodiments, at step 320, the process removes high frequency elements from the current frame (i) and the previous frame (i−1). In one embodiment, a transform coder converts pixel data in an image frame into frequency coefficients. In the frequency domain, low frequency data has greater human perceptual importance than high frequency data. Steps 310 and 320 allow the analysis to be based on the perceptually important low frequency elements of the frame.

At step 330, a luma of the current frame (i) is computed. The luma value, also known as luminescence, represents the brightness of an image (the "black-and-white" or achromatic portion of the image).

At step 340, a luma value of a projection based on the current (i) and previous (i−1) frame is computed. The projection is that of the current frame (i)'s onto a subspace based on the previous frame (i−1). The subspace is obtained by a singular value decomposition of the previous frame (i−1).

At step 350, a residual value based on the difference between the luma values obtained in step 330 and 340 is computed. At step 360, the process filters any residual value using, for example, recursive or adaptive filters and maps the residual value on a score range of 0-1. The adaptive filter helps filter out any artifacts in the residual value recursively. At step 370, the process signals a scene change and marks a scene boundary in the input video stream when the normalized score is greater than a first threshold value. In one embodiment, an exemplary value of such a first threshold value is 0.65. At step 380, in some instances, steps 310 through 370 are repeated for each frame in the input video stream to divide the input video stream into ordered sequences of scenes.

Figure 4:
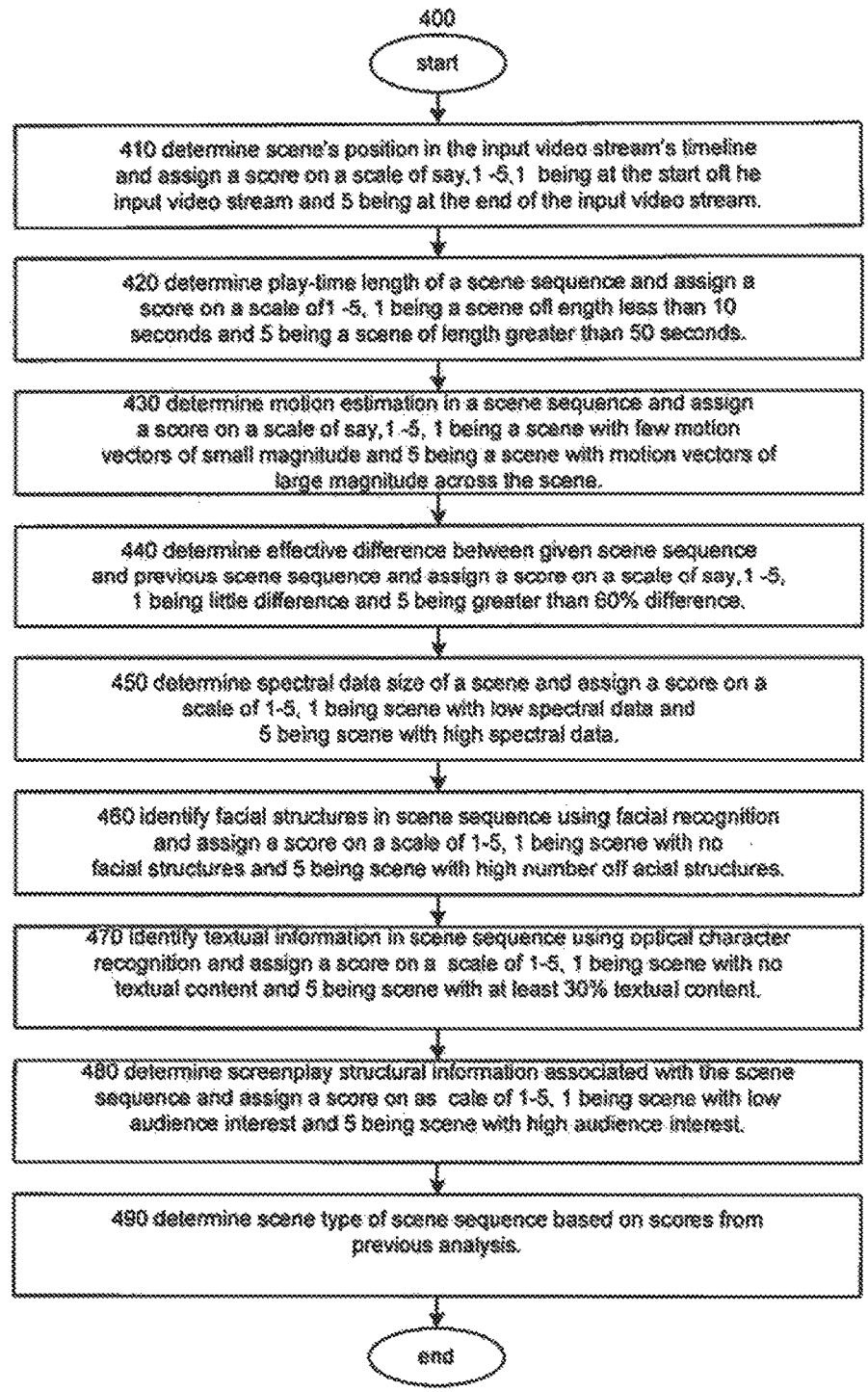
FIG. 4 illustrates steps of a method for determining a scene sequence's scene type.

FIG. 4 illustrates steps of a process 400 for determining a scene type for a given scene sequence. At step 410, the process determines a scene's position in the input video stream's timeline. Based on the scene's position, a score is assigned on a scale of, for example, 1-5. In an illustrative example, a score of 1 could indicate that the scene is at the start of the input video stream and a score of 5 could indicate that the scene is at the end of the input video stream.

At step 420, the process determines a play-time length of a scene sequence and assigns a commensurate score (for example, on a scale of 1-5). In an illustrative example, a score of 1 could mean a scene length of less than 10 seconds and a score of 5 could mean a scene of length greater than 50 seconds.

At step 430, the process performs motion estimation in a scene sequence and assigns a commensurate score (for example, on a scale of 1-5). For example, a score of 1 could mean a scene with little or no motion vectors and a score of 5 could mean a scene with large motion vectors across the scene. Motion Estimation (ME) is generally a technique used to explore temporal redundancy in video sequences during compression. Temporal redundancy arises from the fact that neighboring frames very often share similar pixel regions. Therefore the goal of Motion Estimation is to estimate the shifting of such similar regions (macro-block) across neighbor frames, thus enabling them to be differentially encoded. In block-based ME, the displacement of similar regions is represented by motion vectors, which are computed by a Block-Matching Algorithms.

At step 440, the process computes an effective difference between the given scene sequence and a previous scene sequence. Based on the effective difference, the process assigns a commensurate score (for example, on a scale of 1-5). In an illustrative example, a score of 1 may indicate little difference between the scenes and a score of 5 may indicate a difference greater than xyz threshold. In exemplary instances, the effective difference may be computed using the same scoring principles described above in reference to steps 310 through 370.

At step 450, the process determines a spectral data size of the scene sequence. Based on the spectral data size, a score is assigned on a scale of, for example, 1-5. In an illustrative example, a score of 1 may indicate a scene with low spectral data and a score of 5 may indicate a scene with high spectral data. In one embodiment, transform coding techniques convert video data to the frequency (or spectral) domain, where the frequency domain range of an image frame represents the spectral data size. A transform coder converts pixel data in an image frame into frequency coefficients. In the frequency domain, low frequency data has greater human perceptual importance than high frequency data.

At step 460, the process optionally (or compulsorily in some instances) performs a search for facial structures in a scene sequence using, for example, facial recognition software. Based on the search results, a score may be assigned, for example, on a score of 1-5. Here, in an illustrative example, a score of 1 may indicate no recognized facial structures and a score of 5 may indicate that a scene has a high number of facial structures.

At step 470, the process performs optical character recognition (OCR) in the scene sequence to identify any textual information in the scene sequence. OCR helps differentiate between pictorial and textual content in an image file. OCR utilizes pattern recognition, artificial intelligence and computer vision to perform the differentiation. Based on the OCR analysis, the process assigns a commensurate score (for example, on a scale of 1-5). In an illustrative example, a score of 1 may indicate the absence of any textual content in the scene sequence and a score of 5 may indicate textual content constituting at least 30 percent of the scene sequence's content. i.e. film's credits.

At step 480, the process determines screenplay structural information associated with the scene. In at least some embodiments, the screenplay structural information is a relative attention parameter. A relative attention parameter approximates the relative amount of viewer attention that is to be expected for a given scene sequence. In some instances, the relative attention parameter approximates the relative amount of viewer attention to be expected for a given video segment that a given scene sequence is to be a part of. Based on the analysis, the process assigns a commensurate score (for example, on a scale of 1-5). In an illustrative example, a score of 1 may indicate a low viewer interest in the scene sequence's content and a score of 5 may indicate a high viewer interest in the scene sequence.

At step 490, the process determines a scene type for the scene sequence based on scores from the steps 410 through 480. In one embodiment, the determination of scene type using the scores from steps 410 through 480 can be based on a waterfall process. A waterfall process is a linear, beginning-to-ending, sequential decision-making process, where the process generally does not revisit any intermediate conclusions it has reached along its path to a final decision.

In an illustrative example, a scene involving credits at the end of a movie will generally have text moving in the upward or downward direction. Such a scene sequence typically has small but constant motion vectors, scored at 2 and lower, pointing either upward or downward, depending on the direction of the text. Additionally, the scene sequence normally includes text in the form of movie credits, constituting more than, for example, 30% of the scene content. The optical character recognition process generally scores the scene at 4 or above. Given that movie credits are generally part of every movie and constitute a material part of the end movie timeline, the waterfall process first checks to see whether a scene is of the "scroll credits" type before performing checks for other scene types. In the example, the 2 scores strongly suggest that the scene type involved is of "scroll credits" type and hence the scene type determination could be ended for the scene once the scene is tagged as such. If the scene type were determined not to be of "scroll credits" type, the waterfall process checks the scene sequence to see if it is of one of the scene types other than "scroll credits". Also, once the waterfall process had made a determination that a given scene is not of a particular type, the process generally never reevaluates the scene against that particular scene type.

In another illustrative example, a scene capturing the redwood trees generally involves the trees' green foliage and their surroundings. The foliage would typically constitute a major part of the scene's content. Such a scene would have little or random motion vectors, as the trees themselves stay static while their branches and leaves have minimal motions. The motion estimation score would be close to zero. Furthermore, any recognition of text in the scene would generally be a brief description of the scene, resulting in a low textual content score. The spectral analysis, however, would result in a high score, as the green in the scene's foliage will be captured in the high frequency domain of the spectral data. As discussed earlier, low frequency spectral data has greater human perceptual importance than high frequency data, enabling encoding of images with high spectral data score at lower quality. Based on the scores, the waterfall process will determine that the scene sequence is of a "static scene" type, requiring high encoding quality at the first frame followed by low quality residual encoding and low deblocking filtering.

The above description illustrated processes for determining scene boundaries and scene types. For purposes of determining scene types, in at least some instances, it is useful to determine and analyze motion estimation in a scene in order to determine the magnitude of motion, represented by motion vectors, in a scene sequence. FIG. 5 now illustrates an exemplary process of motion estimation in a scene sequence, as is explained in further detail here. Motion Estimation (ME) is generally a technique used to explore temporal redundancy in video sequences during compression. Temporal redundancy arises from the fact that neighboring frames very often share similar pixel regions. Therefore the goal of Motion Estimation is to estimate the shifting of such similar regions (macro-block) across neighbor frames, thus enabling them to be differentially encoded. In block-based ME, the displacement of similar regions is represented by motion vectors, which are computed by a Block-Matching Algorithms.

In one embodiment, the Block-Matching Algorithm (BMA) searches for similar blocks in an image frame and generates the motion vectors. BMA uses a fast-search approach, which looks only in specific points of the search window, while a similar block is being searched. In another approach, known as multi-resolution motion estimation, ME is performed hierarchically, computing motion vectors for a specific frame region, and refining them in each level. The ME works with different resolutions of one frame, successively refining the found motion vectors. Other strategies look into finding parallelism in BMAs, in order to run ME stages simultaneously.

FIG. 5 illustrates an exemplary approach for motion estimation. Here, in embodiments, images of macroblocks of one frame that are found in subsequent frames (for example, frames at different positions) are communicated by use of a motion vector. FIGS. 5.1 and 5.2 represent the reference frame and the desired frame respectively. The frames are divided into macroblocks, for example, in sizes ranging from 4.times.4 to 16.times.16. In embodiments, each macroblock in the reference frame is compared to the macroblocks in the desired frame to detect a match between any of the macroblocks. FIGS. 5.3 and 5.4 illustrate the reference frame and the desired frame, broken up into their respective macroblocks, which are compared against each other. FIG. 5.5 represents a macroblock from the reference frame that matches a macroblock in the desired frame, although the macroblocks are not in the same grid position in their respective frames. FIG. 5.6 represents motion vectors that are generated by an encoder to communicate a position of the macroblock in the desired frame with respect to the macroblock's position in the reference frame. The motion estimation thus helps determine the motion vectors in a scene sequence, allowing the determination of scene type to be influenced by the magnitude of motion vectors in the scene sequence.

The above description illustrated processes for determining scene type based on motion estimation. For purposes of determining scene types, in addition to motion estimation, in at least some instances, it is useful to determine and analyze screenplay structural information associated with a scene. The screenplay structural information utilizes the general organization of a movie story line to determine the appropriate scene type, allowing for the proper encoding of a given scene.

A movie is generally based on a screenplay. The screenplay is structured so as to grab the audiences' attention. The first part of a movie's screenplay, called the "bite and switch" segment, is generally when most people decide whether to watch the entire movie or not. Therefore, the image quality here is expected to be very high in order to not compromise audience viewing experience. The next part of a movie's screenplay, called the "character development" segment, generally garners low audience attention and can therefore be of lower image quality than the previous segment. The subsequent segment of the movie generally constitutes the plot of the movie, where the audience attention is higher compared to the previous segment. The image quality has to be higher than the previous quality. The next segment of a movie is the "climax", which is the most important part of the movie and the quality of the images need to be high. The final segment is the "credits" of the movie, which garners very low audience attention. The segment can utilize lower quality images without affecting audience viewing experience.

In one embodiment, the screenplay structural information used to determine scene types could be based on a movie's time-line. For example, when a given scene sequence is part of the start of the movie, the scene sequence could be classified as a "bite and switch" scene, garnering high audience attention. The scene sequence could be scored as a 5 on the scale, indicating high audience interest. As a further example, when a given scene sequence is thirty minutes into the movie, it could be assumed that the movie segment involves character development. The character development segment gets low audience attention. Therefore, any scene sequence that is part of the character development could be scored as a 2 or less on the scale. The time-line information, thus, helps determine the scene type.

In one embodiment, the screenplay structural information used to determine scene types could be a relative attention parameter, where the relative attention parameter approximates an estimated viewer interest to be expected for a given segment of the input video stream. The relative attention parameter could be predetermined by a viewer or could be based on input from the movie's director. The information could be included in the input video stream as part of the input video stream's metadata. By parsing the metadata, the relative attention parameter could be determined. The predetermined relative attention parameter could be defined for each given scene sequence in the input video stream or for a given segment of the input video stream that comprises a plurality of scene sequences. When the relative attention parameter indicates high audience attention, the score could be set at 4 or higher. When the relative attention parameter indicates low audience attention, the score could be set at 2 or lower. The relative attention parameter could thus be utilized to determine the scene type.

In one embodiment, the screenplay structural information used to determine scene types could be based on the textual content in the scene sequence or could be based on the closed captioning associated with the scene sequence. In both cases, the textual information is used to determine the movie's screenplay sequence. The screenplay sequence can then be utilized to determine the audience attention for the given scene, with a score of 1 for a scene of low interest and a score of 5 for a scene of high interest. The textual content information could thus be utilized to determine the scene type.

In another embodiment, the screen play structural information used to determine scene types could be based on the audio content associated with the scene sequence. The audio content could be, for example, loudness (amplitude) of the audio content, human speech, silence, language recognition, language differentiation, musical score, sound effects, surround sounds, etc. In an illustrative example, the loudness of the audio content could be used to determine the screenplay segment the scene sequence is part of Action segments in a movie generally have loud audio content associated with them. The loud audio content is needed to get the audiences' full attention. Furthermore, action scenes typically involve special effects, such as explosions, that generate loud audio content. On the other hand, movie segments associated with character development generally involve dialogues at the normal range of human audible amplitude and little special effects such as explosions. The audience attention is typically low in the character development phase of the movie. The audio content's loudness can thus be utilized to determine the audiences' attention for a given scene, with a score of 1 for a scene of low amplitude and a score of 5 for a scene of high amplitude. The amplitude (loudness) of the audio content could thus be utilized to determine the scene type based on the audiences' attention.

In another illustrative example, the sound effects associated with a scene sequence could be used to determine the screenplay segment the scene sequence is part of Special sound effects such as an increasing tempo in the audio content are generally used to indicate a build up to an interesting twist in the movie, an exhilarating action sequence, etc. which garner high audience attention. On the other hand, little sound effects are associated with movie segments involving conversations. The segments generally lack sound effects as conversations typically lack dramatic emotion shifts that can be further emphasized with the sound effects. The audio content's special effects can thus be utilized to determine the audiences' attention for a given scene, with a score of 1 for a scene of low sound effects and a score of 5 for a scene of rich sound effects. The sound effects of the audio content could thus be utilized to determine the scene type based on the audiences' attention.

Figure 6:
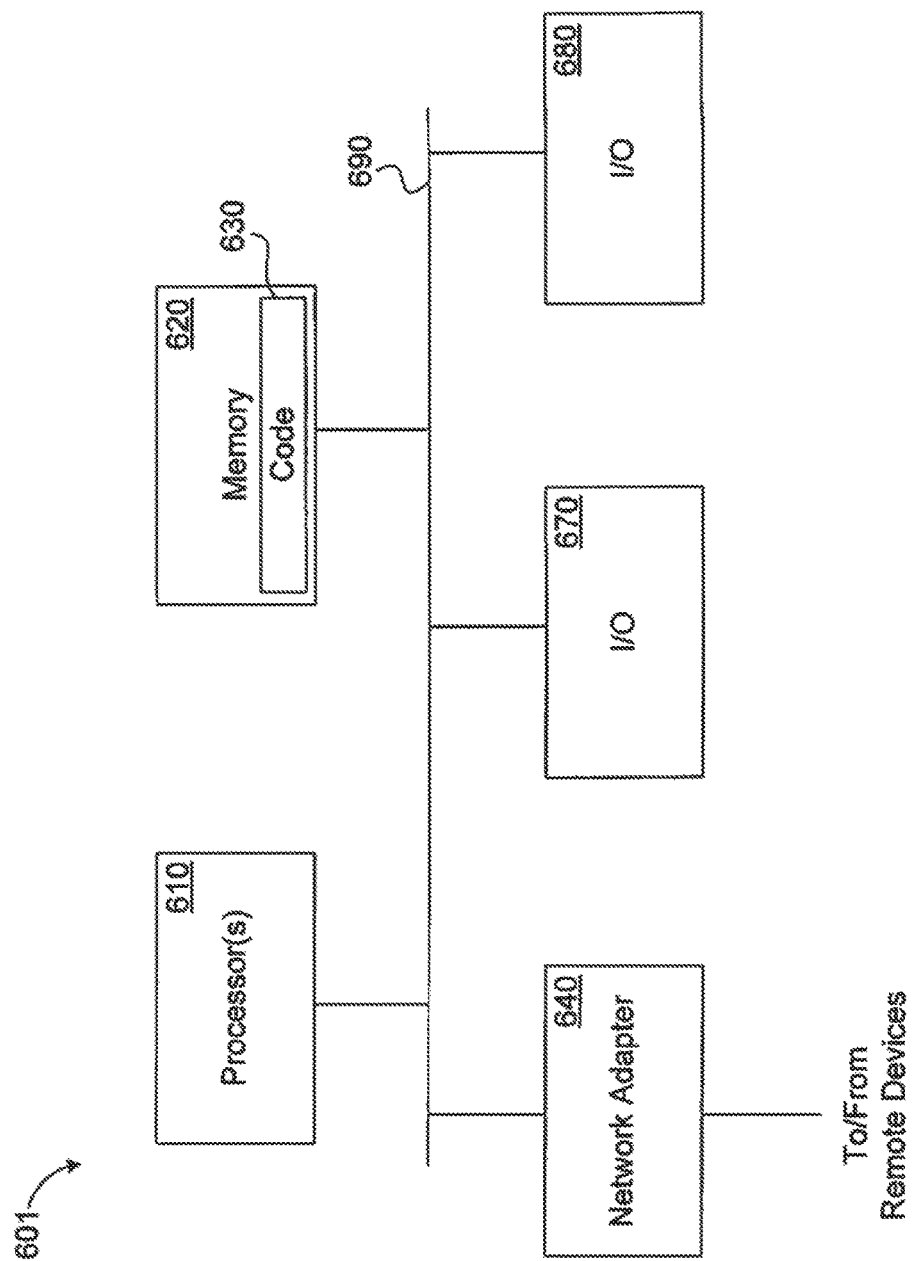
FIG. 6 is a block diagram of a processing system that can be used to implement an encoder implementing certain techniques described herein.

FIG. 6 is a block diagram of a processing system that can be used to implement any of the techniques described above, such as an encoder. Note that in certain embodiments, at least some of the components illustrated in FIG. 6 may be distributed between two or more physically separate but connected computing platforms or boxes. The processing can represent a conventional server-class computer, PC, mobile communication device (e.g., smartphone), or any other known or conventional processing/communication device.

The processing system 601 shown in FIG. 6 includes one or more processors 610, i.e. a central processing unit (CPU), memory 620, at least one communication device 640 such as an Ethernet adapter and/or wireless communication subsystem (e.g., cellular, WiFi, Bluetooth or the like), and one or more I/O devices 670, 680, all coupled to each other through an interconnect 690.

The processor(s) 610 control(s) the operation of the computer system 601 and may be or include one or more programmable general-purpose or special-purpose microprocessors, microcontrollers, application specific integrated circuits (ASICs), programmable logic devices (PLDs), or a combination of such devices. The interconnect 690 can include one or more buses, direct connections and/or other types of physical connections, and may include various bridges, controllers and/or adapters such as are well-known in the art. The interconnect 690 further may include a "system bus", which may be connected through one or more adapters to one or more expansion buses, such as a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The memory 620 may be or include one or more memory devices of one or more types, such as read-only memory (ROM), random access memory (RAM), flash memory, disk drives, etc. The network adapter 640 is a device suitable for enabling the processing system 601 to communicate data with a remote processing system over a communication link, and may be, for example, a conventional telephone modem, a wireless modem, a Digital Subscriber Line (DSL) modem, a cable modem, a radio transceiver, a satellite transceiver, an Ethernet adapter, or the like. The I/O devices 670, 680 may include, for example, one or more devices such as: a pointing device such as a mouse, trackball, joystick, touchpad, or the like; a keyboard; a microphone with speech recognition interface; audio speakers; a display device; etc. Note, however, that such I/O devices may be unnecessary in a system that operates exclusively as a server and provides no direct user interface, as is the case with the server in at least some embodiments. Other variations upon the illustrated set of components can be implemented in a manner consistent with the invention.

Software and/or firmware 630 to program the processor(s) 610 to carry out actions described above may be stored in memory 620. In certain embodiments, such software or firmware may be initially provided to the computer system

601 by downloading it from a remote system through the computer system 601 (e.g., via network adapter 640).

The techniques introduced above can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A method for encoding a video stream using scene types each having a predefined set of one or more of a plurality of encoder parameters used by a video encoder to encode any given scene type, the method comprising:
   receiving an input video stream;
   dividing the input video stream into a plurality of scenes based on scene type boundaries, each scene comprising a plurality of temporally contiguous image frames, wherein the dividing comprises determining a given scene type boundary according to relatedness of two temporally contiguous image frames in the input video stream, and wherein the determining of the given scene type boundary comprises:
      scaling one or more high frequency elements of each image frame;
      converting pixel data in the image frames into frequency coefficients; and
      removing the one or more high frequency elements of each image frame based on the converted frequency coefficients;
   determining a scene type for each of the plurality of scenes; and
   encoding each of the plurality of scenes according to the scene type.

2. The method of claim 1, wherein the determination of the scene type comprises determining the scene type by utilizing facial recognition.

3. The method of claim 1, wherein each scene type is determined based on one or more criteria, the one or more criteria comprising:
   a given scene's position on a timeline of the input video stream;
   a length of the given scene;
   a motion estimation in the given scene;
   an effective difference in the given scene from a previous scene;
   a spectral data size of the given scene;
   an effective optical resolution of a given scene and objects/sections within;
   an optical character recognition in the given scene; or
   a screenplay structure information of the given scene.

4. The method of claim 3, wherein the screenplay structure information comprises a relative attention parameter, and wherein the relative attention parameter approximates a predetermined estimation of a relative amount of viewer attention to be expected for a segment of the input video stream that comprises the given scene.

5. The method of claim 4, wherein the screenplay structure information further comprises one or more of:
   a time range definition;
   a textual information from the given scene;
   an audio content associated with the given scene;
   a close captioning information associated with the given scene; or
   a meta data associated with the given scene.

6. The method of claim 1, further comprising:
   determining that a first image frame is temporally contiguous to a second image frame when the first image frame has at least one adjacent position to the second image frame in a timeline of the input video stream.

7. A method for encoding a video stream using scene types each having a predefined set of one or more of a plurality of encoder parameters used by a video encoder to encode any given scene type, the method comprising:
   receiving an input video stream;
   receiving scene type boundary information that indicates positions in the input video stream where scene transitions occur, wherein a scene transition is determined based on relatedness of two temporally contiguous image frames in the input video stream;

dividing the input video stream into a plurality of scenes based on the scene type boundary information, each scene comprising a plurality of temporally contiguous image frames;

determining scene type for each of the plurality of scenes based on an assessment in a predetermined scale computed by performing a sequential decision-making waterfall process;

encoding each of the plurality of scenes according to the scene type; and determining scene type boundaries in the input video stream by performing operations comprising:
scaling one or more high frequency elements of each image frame;
converting pixel data in the image frames into frequency coefficients;
analyzing the image frames to determine a difference between temporally contiguous image frames, wherein a score is computed based on the difference; and
identifying a degree of unrelatedness between the image frames when the score exceeds a preset limit, wherein the preset limit score is at a threshold where a scene change occurs and;
analyzing the image frames to identify text using OCR and;
analyzing the image frames to determine the existence and locations of people faces.

8. The method of claim 7, wherein the performing of the sequential decision-making waterfall process comprises:
determining a position of a given scene on a timeline of the input video stream to assign a score based on a predetermined scale according to the position;
determining a play-time length of the given scene to assign a score based on a predetermined scale according to the play-time length;
determining a motion estimation in the given scene to assign a score based on a predetermined scale according to a magnitude of a motion vector, wherein the motion estimation is a measure of the magnitude of the motion vector;
determining a difference in the given scene from a previous scene to assign a score based on a predetermined scale according to the difference;
determining a spectral data size of the given scene to assign a score based on a predetermined scale according to the spectral data size;
determining an optical resolution of the given scene to assign an optical size according to an effective optical resolution of the image frames as well as main sections and objects within the scene and image frames;
identifying facial structures utilizing facial recognition to assign a score based on a predetermined scale according to a number of the facial structures;
identifying textual information using optical character recognition in the given scene to assign a score based on a predetermined scale according to an amount of content of the textual information; and
determining a level of audience interest from screenplay structure information of the given scene to assign a score based on a predetermined scale according to the level of audience interest.

9. The method of claim 8, wherein the screenplay structure information comprises a relative attention parameter, and wherein the relative attention parameter approximates a predetermined estimation of a relative amount of viewer attention to be expected for a segment of the input video stream that comprises the given scene.

10. The method of claim 9, wherein the screenplay structure information further comprises one or more of:
a time range definition;
a textual information from the given scene;
an audio content associated with the given scene;
a close captioning information associated with the given scene; or
a meta data associated with the given scene.

11. The method of claim 8, wherein a first image frame is temporally contiguous to a second image frame when the first image frame has at least one adjacent position to the second image frame in a timeline of the input video stream.

12. A video encoding apparatus for encoding a video stream using scene types each having a predefined set of one or more of a plurality of encoder parameters used by the video encoder to encode any given scene type, the apparatus comprising:
an input circuit that receives an input video stream;
a video processing circuit that divides the video stream into a plurality of scenes based on scene boundaries, each scene comprising a plurality of temporally contiguous image frames, the video processing circuit also determines a scene boundary according to the relatedness of two temporally contiguous image frames in the input video stream, the video processing circuit further determines a scene type for each of the plurality of scenes, wherein, in determining the scene boundary, the video processing module is configured to perform operations comprising:
scaling one or more high frequency elements of each image frame, wherein a transform coder converts pixel data in the image frames into frequency coefficients, and
removing the one or more high frequency elements of each image frame based on the converted frequency coefficients; and
a video encoding module to encode each of the plurality of scenes according to the scene type.

13. The apparatus of claim 12, wherein the video processing circuit further determines each scene type based on one or more criteria, the one or more criteria comprising:
a given scene's position on the input video stream's timeline;
a length of the given scene;
a motion estimation in the given scene;
an effective difference in the given scene from a previous scene;
a spectral data size of the given scene;
an optical character recognition in the given scene; or
a screenplay structure information of the given scene.

14. The apparatus of claim 13, wherein the screenplay structure information utilized by the video encoding apparatus comprises a relative attention parameter, and wherein the relative attention parameter approximates a predetermined estimation of a relative amount of viewer attention to be expected for a segment of the input video stream that comprises the given scene.

15. The apparatus of claim 14, wherein the screenplay structure information further comprises one or more of:
a time range definition;
a textual information from the given scene;
an audio content associated with the given scene;

a close captioning information associated with the given scene; or a meta data associated with the given scene.

16. The apparatus of claim 12, wherein the video processing circuit further utilizes facial recognition to determine the scene type.

17. The apparatus of claim 12, wherein, in determining the scene boundary, the video processing circuit further performs operations comprising:
analyzing the image frames to determine a difference between temporally contiguous image frames, wherein a score is computed based on the difference;
identifying a degree of unrelatedness between the image frames when the score exceeds a preset limit, wherein the preset limit score is at a threshold where a scene change occurs;
analyzing the image frames to identify text using optical character recognition (OCR); and
analyzing the imager frames to determine the existence and locations of people faces.

18. The apparatus of claim 12, wherein the video processing circuit further utilizes one of a recursive filter or an adaptive filter to track the difference.

19. The apparatus of claim 17, wherein the encoder parameters utilized by video encoding module comprise one or more of:
a motion estimation range search;
a two-dimensional (2D) frame size;
a quantizer; or
a reference frame numbers.

20. A method for encoding a video stream using scene types each having a predefined set of one or more of a plurality of encoder parameters used by a video encoder to encode any given scene type, the method comprising:
receiving an input video stream;
dividing the input video stream into a plurality of scenes based on scene boundaries, each scene comprising a plurality of temporally contiguous image frames, wherein a given scene boundary is determined according to a screenplay structure information of the input video stream, wherein the screenplay structure information comprises information of story line organization of the input video stream;
determining scene type for each of the plurality of scenes based on an assessment in a predetermined scale computed by performing a sequential decision-making waterfall process;
encoding each of the plurality of scenes according to the scene type; and
determining that a first image frame is temporally contiguous to a second image frame when the first image frame has at least one adjacent position to the second image frame in a timeline of the input video stream.

21. The method of claim 20, wherein the screenplay structure information comprises a relative attention parameter, and wherein the relative attention parameter approximates a predetermined estimation of a relative amount of viewer attention to be expected for each of a plurality of video segments of the input video stream, wherein each of the plurality of video segments could comprise a plurality of scenes.

22. The method of claim 21, wherein the screenplay structure information further comprises one or more of:
a time range definition;
a motion estimation load from a give scene;
a textual information from the given scene;
an audio content associated with the given scene; or
a close captioning information associated with the given scene.

23. The method of claim 20, wherein a given scene type comprises one or more of:
an action scene;
an opening scene;
a head-shot scene;
a dialog scene; or
a credits scene.

24. The method of claim 20, wherein the performing of the sequential decision-making waterfall process comprises:
determining a position of a given scene on a timeline of the input video stream to assign a score based on a predetermined scale according to the position;
determining a play-time length of the given scene to assign a score based on a predetermined scale according to the play-time length;
determining a motion estimation in the given scene to assign a score based on a predetermined scale according to a magnitude of a motion vector, wherein the motion estimation is a measure of the magnitude of the motion vector;
determining a difference in the given scene from a previous scene to assign a score based on a predetermined scale according to the difference;
determining a spectral data size of the given scene to assign a score based on a predetermined scale according to the spectral data size;
identifying facial structures utilizing facial recognition to assign a score based on a predetermined scale according to a number of the facial structures;
identifying textual information using optical character recognition in the given scene to assign a score based on a predetermined scale according to an amount of content of the textual information; and
determining a level of audience interest from screenplay structure information of the given scene to assign a score based on a predetermined scale according to the level of audience interest.

25. The method of claim 1, wherein the determining of the given scene boundary further comprises:
analyzing the image frames to determine a difference between temporally contiguous image frames, wherein a score is computed based on the difference; and
identifying a degree of unrelatedness between the image frames when the score exceeds a preset limit, wherein the preset limit score is at a threshold where a scene change occurs.

* * * * *